United States Patent [19]

Rodriguez et al.

[11] Patent Number: 5,913,973
[45] Date of Patent: Jun. 22, 1999

[54] METHOD FOR PRODUCING HIGH SOLIDS AQUEOUS ACID-RESISTANT CALCIUM CARBONATE SUSPENSIONS AND PRODUCT THEREOF

[75] Inventors: Jose M. Rodriguez, Eatonton; Steven M. Fortier, Milledgeville, both of Ga.

[73] Assignee: ECC International Inc., Roswell, Ga.

[21] Appl. No.: 08/889,663

[22] Filed: Jul. 8, 1997

[51] Int. Cl.$^6$ ...................................................... C09C 1/02
[52] U.S. Cl. ........................... 106/464; 106/465; 423/430
[58] Field of Search ..................................... 106/464, 465; 162/181.2, 183; 423/430

[56] References Cited

U.S. PATENT DOCUMENTS

| | | |
|---|---|---|
| 4,618,374 | 10/1986 | Thompson, III et al. . |
| 4,650,521 | 3/1987 | Koppelman et al. . |
| 4,888,315 | 12/1989 | Bowman et al. . |
| 4,916,094 | 4/1990 | Salinas . |
| 5,043,017 | 8/1991 | Passaretti ................................ 106/465 |
| 5,317,053 | 5/1994 | Brown et al. . |
| 5,531,821 | 7/1996 | Wu ........................................ 106/464 |
| 5,593,488 | 1/1997 | Wu ........................................ 106/465 |
| 5,593,489 | 1/1997 | Wu ........................................ 106/465 |
| 5,599,388 | 2/1997 | Wu ........................................ 106/464 |
| 5,676,747 | 10/1997 | Brown ................................... 106/465 |
| 5,711,799 | 1/1998 | Snowden et al. . |

*Primary Examiner*—Michael Marcheschi
*Attorney, Agent, or Firm*—Suzanne Kikel

[57] ABSTRACT

A method for producing a high solids slurry of an acid-resistant precipitated calcium carbonate for shipping purposes is disclosed. A low solids of about 18 wt. % to 20 wt. % solids slurry is treated with a chemical additive, such as sodium aluminate, in order to impart acid resistance to the calcium carbonate, and is dewatered to form an intermediate solids slurry of about 44 wt. %. This intermediate solids slurry is then diluted with a fraction of the low solids slurry which was treated with the chemical additive, in order to bring the intermediate slurry to a final high solids slurry of about 35 wt. %. Acid is added to the final product slurry in order to reduce the pH of the final slurry to within a buffering range of about 7.0 to 6.5. The final product slurry of about 35 wt. % comprises an acid-resistant calcium carbonate composition with a pH of about 7.0 which can be shipped for ultimate use when making paper under neutral pH conditions. The final product slurry has a Brookfield viscosity ranging from 200 to 500 centipoise at 100 rpm.

10 Claims, 1 Drawing Sheet

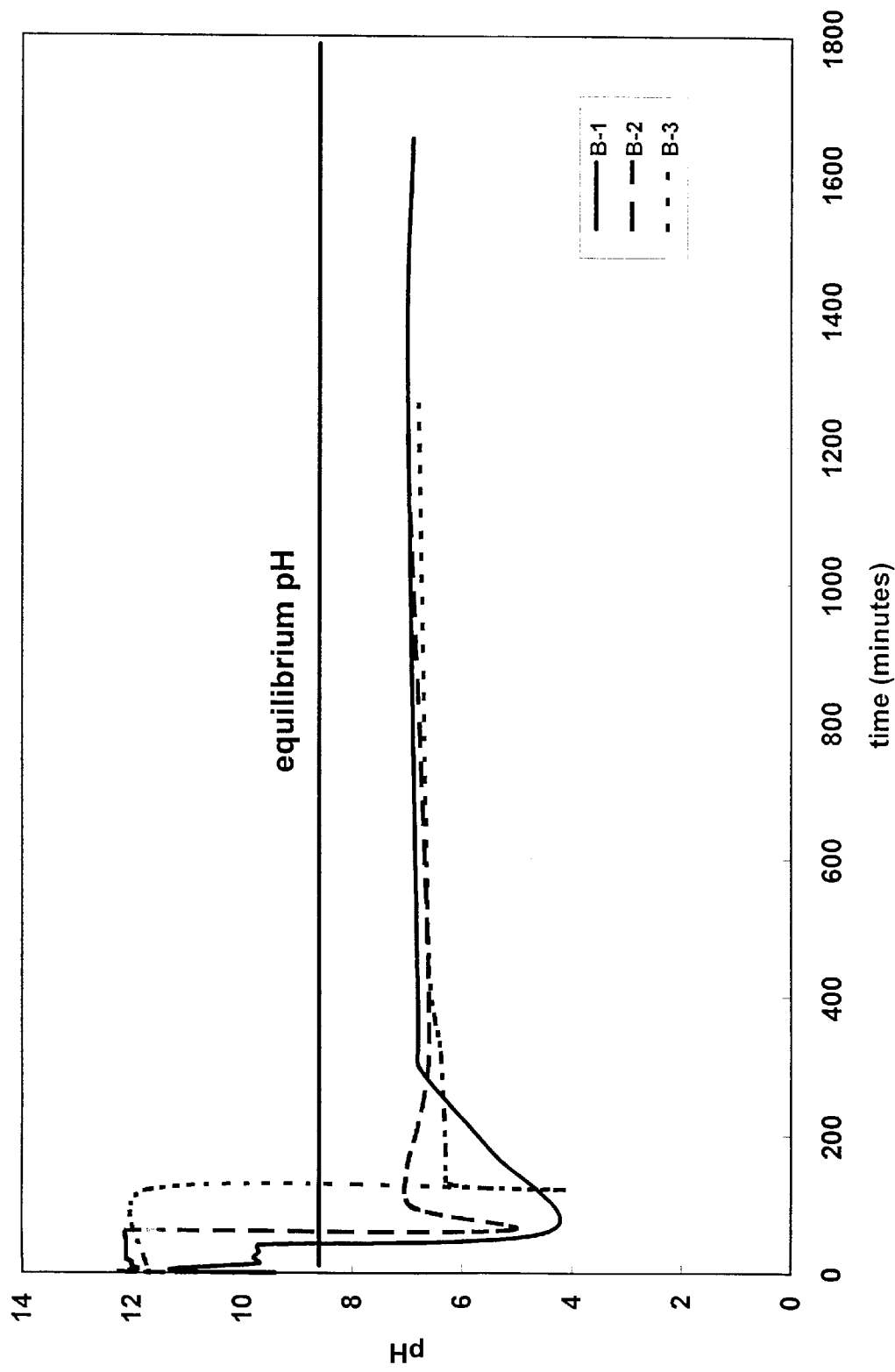

METHOD FOR PRODUCING HIGH SOLIDS AQUEOUS ACID-RESISTANT CALCIUM CARBONATE SUSPENSIONS AND PRODUCT THEREOF

BACKGROUND OF THE INVENTION

1. Field of the Invention

This invention relates generally to an acid-resistant calcium carbonate for use in groundwood papermaking systems and related industries, and more particularly is directed to the preparation of a high solids slurry of about 35 wt. % of an acid-resistant precipitated calcium carbonate composition suitable for shipping at an economic rate.

2. Description Of The Related Art

Calcium carbonate, particularly precipitated calcium carbonate, has been used as a filler material in the making of wood-free alkaline paper. Such usage results in a paper with enhanced optical properties, particularly high brightness and opacity, without the expense incurred using titanium oxide fillers, resulting in a much less expensive product. Calcium carbonate, however, cannot generally be used as a filler in acidic paper made from mechanical pulp furnishes because it decomposes in an acidic environment. Since mechanical pulp sheets and newsprint are made in the acidic range, there has long been a need to develop a calcium carbonate composition which is acid stabilized and resistant to decomposition at low pH, so that it can be utilized as a filler material in the manufacture of such paper, such as groundwood paper, where the use of alkaline filler would have a negative impact on the final paper properties.

Paper made from mechanical pulps have been additionally produced under acidic papermaking conditions because of "fiber alkaline darkening" that occurs as pH rises. This means that there is a reduction in brightness of the paper (brightness reversion) when the pH is raised from acid to alkaline in wood-containing systems. Alkaline darkening will occur to some degree in any wood pulps with significant lignin content. The degree of darkening depends on the particular pulps, the pH and the water quality. In general, ground and precipitated calcium carbonate fillers buffer wet end in the 7.5–8.2 pH range. Acid-resistant calcium carbonate compositions thus provide a means for reducing the degree of fiber alkaline darkening and brightness reversion due to their ability to maintain a lower, stabilized pH.

As is known in the art, the acid-resistant calcium carbonate compositions are utilized to improve the optical properties of neutral to weakly acidic paper by its addition to the paper during standard manufacturing processes. Typically, the acid-resistant calcium carbonate composition is added to a first paper furnish containing components necessary for making acidic paper to thereby form a second paper furnish. The amount of calcium carbonate composition which is added to the paper furnish is dependent upon the particular characteristics of the particular furnish, and the desired degree of brightness in the finished product. Representative amounts of the composition for typical paper furnishes range from about 1% to about 30% by weight of the finished product weight. Most preferably, the calcium carbonate compositions are utilized in the range of about 5% to about 20% by weight of the finished product.

Several U.S. patents disclose acid-resistant calcium carbonates. Among these are U.S. Pat. Nos. 5,531,821; 5,584,923; 5,593,488; 5,593,489; and 5,599,388, which patents are assigned to the assignee of the present invention. Other examples of acid-resistant or stabilized carbonate compositions are disclosed in pending patent applications bearing U.S. Ser. Nos. 08/546,493; 08/614,863; and 08/546,145, also owned by the assignee of the present application.

Patent application bearing U.S. Ser. No. 08/614,863 filed Mar. 13, 1996, has recently been allowed. This disclosure teaches the preparation of an acid-resistant calcium carbonate by using sodium aluminate and one or more weak acids to treat the calcium carbonate. This product is produced by ECC International Inc. under the tradename OPTICAL® NB (neutrally buffered) calcium carbonate.

In U.S. patent application Ser. No. 08/614,863, the acid-resistant calcium carbonate composition comprises a mixture of calcium carbonate with at least about 0.1 percent and perhaps about 1 to 6 percent, based on the dry weight of calcium carbonate, of sodium aluminate, together with about 0.1 percent, based on the dry weight of the calcium carbonate, of one or more weak acids. It was found that the inclusion of sodium aluminate together with an amount of weak acid sufficient to neutralize the composition conferred a higher degree of acid resistance for the calcium carbonate composition in the presence of fiber slurry, and a longer term of pH stability than the prior acid-stabilized calcium carbonate compositions. In one embodiment, the weak acid may consist of a mixture of phosphoric acid together with an organic polymeric acid. The process for producing this acid tolerant calcium carbonate involves first adding to the slurry, containing the precipitated calcium carbonate particles, the sodium aluminate which raises the pH to about 11 or 12, followed by adding the weak acids to the resultant mixture. The resultant mixture is blended for a sufficiently long period of time to ensure uniform mixing of the ingredients, and then allowed to settle.

As stated, this product of U.S. patent application Ser. No. 08/614,863 may be equivalent to the acid-resistant calcium carbonate product of the present assignee, ECC International Inc. (Atlanta, Ga.) and which product is commercially available under the tradename OPTICAL® NB (neutrally buffered) calcium carbonate. This product is generally shipped to the customer in slurry form having low solids of about 18% to about 20% by weight. Another calcium carbonate product manufactured and sold by the assignee of the present invention, which is not an acid-resistant calcium carbonate, is referred to as OPTICAL® HB (high bulk). This product is a precipitated calcium carbonate comprised of scalenohedral particles with a median particle size of about 2 $\mu$m and a Blaine surface area of 22,000 cm$^2$/g. A calcium carbonate with these characteristics may be readily available from other sources in addition to the assignee of the present invention.

In order to produce the product referred to as OPTICAL® NB, a calcium carbonate similar to the OPTICAL® HB product having the characteristics discussed in the preceding paragraph is generally chemically treated with 1 wt. % sodium aluminate, based on the dry weight of the calcium carbonate, to impart resistance to the acid dissolution of the calcium carbonate. The pH of the treated slurry is adjusted to 6.8 to 7.0 by the addition of 4 wt. % phosphoric acid. In a manner well-known to those skilled in the art, small amounts of citric acid may be added in the high solids storage tank as necessary to ensure pH stability.

It is thought that it would be more economical to ship this slurry product of the acid-resistant calcium carbonate compositions at 35% solids instead of the 18% to 20% solids by weight, which is presently being shipped. However, in doing this, it would still be necessary to maintain the integrity of the acid-resistant calcium carbonate composition in that the pH of the chemically treated calcium carbonate should remain in the neutral range of between 7.0 to 6.5 over long periods of time during shipping.

Precipitated calcium carbonates which are not acid-resistant, are presently being shipped in a slurry form which is greater than 20% solids, by weight. However, it is not known to the inventors that a high solids slurry of an acid-resistant precipitated calcium carbonate is being shipped while still maintaining the required characteristics of the product performance for particular paper applications.

SUMMARY OF THE INVENTION

The present invention provides for the preparation of an acid-resistant calcium carbonate composition slurry which can be shipped at a higher solids percentage slurry than previously without effecting its performance such as for use as a filler in neutral to weakly acidic paper. More particularly, this invention involves forming a low solids slurry of about 10 wt. % to about 20 wt. % of an acid-resistant calcium carbonate composition which can be processed to produce a final high solids slurry of about 20 wt. % to about 40 wt. %, preferably, about 35 wt. % solids. In a preferred embodiment, the solids in the slurry are acid tolerant or acid-resistant calcium carbonate particles which have been treated with a mixture of at least about 0.1 percent, preferably about 1 percent by weight, based on the dry weight of the calcium carbonate, of a sodium aluminate, together with at least 0.1 percent preferably about 1 to 8 wt. % and preferably 3.5 to 4.5 wt. %, based on the dry weight of the calcium carbonate, of one or more weak acids, preferably phosphoric acid.

In the process of one embodiment of the present invention, a low solids slurry of about 18 wt. % to about 20 wt. % solids of a calcium carbonate is first formed. To this low solids slurry, the sodium aluminate, for reacting with the calcium carbonate is added in order to make the calcium carbonate acid-resistant. This initial slurry is dewatered to form an intermediate slurry having a weight percent solids ranging from about 40 wt. % to about 50 wt. %, and preferably, about 44 wt. % solids. This weight percent solids of the intermediate slurry is reduced to a final product slurry of about 20 wt. % solids to about 40 wt. % solids, and preferably about 35 wt. % solids. This is brought about by adding to the intermediate slurry the overflow from the initial slurry, containing the sodium aluminate, a weak acid or acids, such as phosphoric acid, is then added to the final slurry treated with sodium aluminate in order to adjust the pH to a target of about 6.0 to about 7.5. The final product slurry is desirable for shipping purposes in that it has a high solids content of about 20 wt. % to about 40 wt. % and a Brookfield viscosity ranging from between 200 to 500 centipoise at 100 rpm.

It is, therefore, an object of the present invention to provide a process for optimizing the solids percentage of a slurry of an acid-resistant calcium carbonate composition while still maintaining the pH stability of the slurry.

This and other objects of the present invention will be better understood and appreciated when the following description is read along with the single drawing.

BRIEF DESCRIPTION OF THE DRAWING

The single drawing is a graph showing the buffering behavior of the neutrally buffered slurries of the examples of the invention where the pH values are plotted against time.

DETAILED DESCRIPTION OF THE INVENTION

The high solids slurry of the present invention comprises an acid-resistant calcium carbonate composition which may be used as a filler material in the making of neutral to weakly acid paper. One of the preferred acid-resistant calcium carbonate compositions comprises calcium carbonate particles together with sodium aluminate and one or more weak acids as disclosed and taught in the above discussed patent application bearing U.S. Ser. No. 08/614,863 which is incorporated herein by reference.

The calcium carbonate utilized may preferably be finely divided and it can be either a precipitated calcium carbonate (PCC) or a natural ground limestone (GCC).

The sodium aluminate utilized in the process of an embodiment of the invention is typically an aluminum compound containing the $Al^{+3}$ ion in an ionic hydroxy-or oxo-complex. Typical forms of sodium aluminate are expressed chemically as $NaAlO_2$ or $Na_2Al_2O_4$.

The amount of sodium aluminate may be at least 0.1 percent based on the dry weight of the calcium carbonate, and preferably about 1.0 percent by weight, based on the dry weight of the calcium carbonate.

The amount of the weak acid utilized may be at least 0.1 percent, based on the dry weight of the calcium carbonate and preferably about 3.5 to about 4.5 wt. %, based on the dry weight of calcium carbonate.

The weak acid utilized in the composition of the present invention may preferably be a weak acid selected from the group consisting of phosphoric acid, metaphosphoric acid, hexametaphosphoric acid, ethylenediaminetetraacetic acid (EDTA), citric acid, sulfurous acid, boric acid, acetic acid, and mixtures thereof. The weak acid may be a mixture of weak acids, together with a further organic, polymeric acid, such as polyacrylate acid, polymaleic acid, and polycarboxylic acid, and mixtures thereof. The organic polymeric acid may typically be an organic polymer having a weight average molecular weight, M, in the range of 750–1,000,000, consisting of regularly repeating units or chemically similar units, connected by primary covalent bonds. The total amount of the weak acid utilized may be at least 0.1 percent, based on the dry weight of the calcium carbonate, and is preferably about 3.5 to 4.5 wt. %, based on the dry weight of the calcium carbonate. Typically, 2–4% phosphoric acid may be utilized in combination with a 1–6% of the organic, polymeric acid.

Combinations for use in the present invention may include sodium aluminate/phosphoric acid; sodium aluminate/phosphoric acid/polyacrylate acid; and sodium aluminate/phosphoric acid/polymaleic acid. Where the weak acid is a mixture, preferred combinations may include 1% sodium aluminate/6% phosphoric acid/1% polyacrylate acid; and 0.5% sodium aluminate/6% phosphoric acid/1% polymaleic acid combinations.

The weak acid (or acids) can be utilized in the process of preparation in either a pure concentrated form or as aqueous solutions.

The process for producing the high solids slurry of the invention which comprises the acid-resistant calcium carbonate composition involves the following steps:

(a) forming a low solids slurry of calcium carbonate by any of the procedures familiar to those skilled in the art, with either a precipitated calcium carbonate (PCC) or a ground calcium carbonate (GCC) to produce a slurry with a weight percent solids ranging from about 10 wt. % to about 20 wt. %, and preferably 18 wt. % solids;

(b) adjusting the pH of the slurry to about 11 to 12 by adding about 1 wt. %, based on the weight of calcium carbonate, the sodium aluminate to this low solids slurry, and allowing the sodium aluminate to react with the calcium carbonate for about an hour;

(c) dewatering this initial slurry to produce a paste-like intermediate slurry with a weight percent solids about 40 to 50 wt. %, and preferably about 44 wt. % solids;

(d) adding a liquid to this intermediate slurry to produce a final product slurry having a percent solids ranging from about 20 to 40 wt. %, preferably 35 wt. % solids; and (e) adding at least about 0.1 wt. %, preferably about 3.5 to 4.5 wt. %, based on the dry weight of the calcium carbonate, of one or more weak acids, preferably phosphoric acid, either by itself or in combination with one of the other weak acids discussed hereinabove, to this resultant mixture to adjust the treated slurry to a pH of below 7.0 or about 6.5.

The liquid of step (d), preferably, is the overflow from the initial low solids slurry of step (b), which overflow contains the sodium aluminate treated low solids slurry. This liquid may be water or, in some instances, this liquid may be a chemical, such as a dispersant, depending on the end use of the high solids slurry.

In some instances, the intermediate slurry of step (c) may be eliminated depending on the type of equipment available or used in the production plant for preparing the high solids slurry of an acid-resistant calcium carbonate. Due to the limitations of the centrifuge in the plants of the assignee of the invention, it was necessary to first bring the low solids slurry of step (a) down to a paste-like slurry of step (c), and then up to the high solids slurry of step (d). The use of other types of dewatering apparatuses may eliminate step (c), whereby after step (b), the low solids slurry can be directly dewatered to the final product slurry of step (d).

The initial low solids slurry of step (a) may have a Brookfield viscosity of about 30 centipoise at 100 rpm. The final high solids slurry of step (e) preferably has a Brookfield viscosity between about 200 to about 500 centipoise at 100 rpm. The calcium carbonate can be utilized in the above-described process either as a dry powder or an aqueous slurry with up to about 60 percent by weight solids content prior to when the slurry is dewatered to the low solids content of about 10 wt. % to about 20 wt. % in step (a) above.

The sodium aluminate can be utilized in the instant process either as a dry solid or as an aqueous solution. Since a slurry of the calcium carbonate is utilized, the solid form of the sodium aluminate readily dissolves therein so that an aqueous solution of the sodium aluminate may be unnecessary.

Similar to that discussed in the aforesaid patent application bearing U.S. Ser. No. 08/614,863, it is believed by the inventors that the acid resistance conferred upon the calcium carbonate compositions produced in a manner similar to the present invention is a result of the inactivation of the surface of the calcium carbonate by at least the addition of sodium aluminate.

The invention will be further illustrated by the following examples, which are to be considered illustrative of the invention, and not limited to the precise embodiments shown:

Starting Material

The starting slurry material in the following three examples consisted of 4,000 gallons of OPTICAL® HB (high bulk) which, as mentioned hereinabove, is a precipitated calcium carbonate product manufactured and sold by the present assignee, ECC International, Inc. (Atlanta, Ga.). This precipitated calcium carbonate (PCC) product is a coarse, scalenohedral particle. In the following examples the "dry weight equivalent of PCC" can be defined as the amount of dry PCC solids present when a given volume of PCC slurry is dried completely.

This starting material had the following characteristics:

Blaine surface area=21,500 $cm^2/g$ median particle size=2.23 microns solids=19.7%

Brookfield viscosity @ 100 cpm-30 centipoise pH-9.4 free lime=0.3 wt. % conductivity=1,045 $\mu s$

EXAMPLE 1

Control Example

An initial PCC slurry of the above defined starting material with 18 wt. % solids by weight was placed into a 50 gallon reaction vessel with no baffles. The dry weight equivalent of the PCC was 39 lbs. A Cowles mixer with a 51 horsepower motor operating at 1163 rpm was used to agitate the slurry during the reaction.

1 wt. % of sodium aluminate, based on the dry weight of the PCC, was added to the slurry, and allowed to react for one hour while the pH of the slurry was measured at periodic intervals.

After one hour of reaction time, phosphoric acid with a concentration of 85% was added to the reacted slurry in an amount equal to 4.5 wt. %, based on the dry weight equivalent amount of the PCC.

The slurry pH was monitored periodically for more than 24 hours.

The pH values for this control example are plotted against time in the single drawing and the resultant curve is identified as "B-1".

The wt. % solids of the slurry remained at about 18 wt. % and was not brought down to a final slurry of 35 wt. % solids as in the following Examples 2 and 3.

EXAMPLE 2

Lab Scale Production of PCC High Solids

An initial PCC slurry of the above defined starting material with 18 wt. % solids was placed into a 50 gallon reaction vessel with no baffles. The dry weight equivalent of PCC was 52 lbs. A Cowles mixer with a 5 horsepower motor operating at 1150 rpm was used to agitate the slurry during the reaction.

1 wt. % of sodium aluminate, based on the dry weight of the precipitated calcium carbonate, was added to this initial slurry, and allowed to react with the calcium carbonate for one hour while the pH of this initial slurry was measured at periodic intervals.

After one hour, the 18 wt. % solids initial slurry was dewatered with a laboratory scale centrifuge which was operated at 1800 rpm. The resulting high solids intermediate product was a 44 wt. % PCC paste which was made down to a final slurry of 35 wt. % solids by diluting this intermediate product slurry with a fraction of the initial 18 wt. % solids slurry which had been treated with sodium aluminate. The amount of the initial solids slurry was sufficient to achieve the 35 wt. % solids in the final slurry. The Brookfield viscosity of the final 35 wt. % high solids slurry was 272 centipoise @ 100 rpm.

To this reacted final slurry of 35 wt. % solids, a concentration of 85% phosphoric acid was added in an amount equal to 4.5 wt. %, based on the dry equivalent amount of PCC, in order to bring the pH values down from 12 or 11 into a neutrally buffered range of about 7.0 to 6.5.

The pH of this final slurry was monitored periodically for more than 24 hours. The curve for the pH values vs. time for this Example 2 is identified in the single drawing as "B-2a".

EXAMPLE 3
Pilot Scale Production Of PCC High Solids

An initial PCC slurry of the above starting material with 19 wt. % solids was placed into a 2,000 gallon reaction vessel with baffles. The dry weight equivalent of PCC was 3,600 lbs. An agitator with a 5 horsepower motor operating at 1,755 rpm was used to agitate the slurry during the reaction.

1 wt. % of sodium aluminate, based on the dry weight of the PCC, was added to this initial PCC slurry and allowed to react for one hour while the pH of the slurry was measured at periodic intervals.

After one hour reaction time, this initial 19 wt. % solids slurry was dewatered with a pilot plant scale centrifuge operated at 1,800 rpm. The resulting high solids intermediate product was a 44 wt. % PCC paste which was made down to a final slurry of 35 wt. % solids by diluting this intermediate product slurry with a fraction of the initial 19 wt. % solids slurry treated with the sodium aluminate. This amount of initial slurry is sufficient to achieve the 35 wt. % solids slurry.

To this reacted final slurry of 35 wt. % solids, a concentration of 85% phosphoric acid was added in an amount equal to 4.5 wt. %, based on the dry weight equivalent amount of PCC, in order to bring its pH down from 12 or 11 to about 7.0 or 6.5.

The pH of the final slurry of 35 wt. % solids was monitored periodically for more than 24 hours.

The curve for the pH values vs. time for this Example 3 is identified in the drawing as "B-3".

From the three curves in the graph of the drawing, it can be seen that the pH of the calcium carbonate for each of the three examples starts out at about 8.5 or 9.0; it increases to about 11 or 12 upon the addition of the sodium aluminate, then decreases to 4 or 5 upon the addition of the phosphoric acid; and finally remains below 7.0 or at 6.5 for an extended period of time after the addition of the phosphoric acid. All three curves indicate effective neutral buffering of the calcium carbonate with the sodium aluminate as shown by the pH remaining at or below 7.0 for extended periods after the addition of the phosphoric acid. If the three curves were sloping upwardly toward the horizontal line in the drawing, then this would indicate that the calcium carbonate was not acid resistant and that it was deteriorating or dissolving in the acid. The term "neutrally buffered calcium carbonate" can be defined as that calcium carbonate which can withstand dissolution in a pH environment of about 6.0 to about 7.5. When the results of Examples 2 and 3, which involve the teachings of the invention, are compared to that of the control Example 1, which does not involve the invention, it can be seen that the pH of the high solids slurry of an acid-resistant calcium carbonate composition of the invention will remain stable over an extended period of time.

While the present invention has been particularly set forth in terms of specific embodiments thereof, it will be understood in view of the instant disclosure, that numerous variations upon the invention are now enabled to those skilled in the art, which variations may reside within the scope of the present invention. For example, other chemicals such as those disclosed in the prior art, such as those discussed above, may be used to create the acid-resistant quality of the calcium carbonate composition instead of the sodium aluminate/phosphoric acid combination disclosed herein. Accordingly, the invention is to be broadly construed and limited only by the scope and spirit of the claims now appended hereto.

What is claimed is:

1. A method for producing a stable, high solids aqueous slurry having a solids in a range from about 20% to about 40% by weight of an acid-resistant calcium carbonate for use as a filler in the manufacture of neutral to acidic paper products, the steps comprising:

(a) forming an initial low solids slurry having a solids content in a range from about 10% to about 20% by weight of calcium carbonate particles;

(b) adding at least about 0.1 percent, based on the dry weight of calcium carbonate, of sodium aluminate to the low solids slurry of step (a) to produce a slurry with a pH of about 11;

(c) dewatering a resultant slurry of step (b) to form an intermediate slurry with a wt. % solids in a range from about 40% to about 50% by weight of calcium carbonate;

(d) adding an overflow of the sodium aluminate treated low solids slurry of step (b) to a resultant slurry of step (c) to form a final product slurry having a wt. % solids in said range from about 20% to about 40% by weight calcium carbonate; and (e) adding at least about 0.1 percent, based on the dry weight of calcium carbonate, of at least one weak acid to the slurry of step (d) in order to reduce the pH of the slurry into a neutrally buffered range of about 6.0 to about 7.5.

2. A method of claim 1 wherein the sodium aluminate of step (b) is present in an amount of about 1.0 percent, based on the dry weight of calcium carbonate and wherein the weak acid of step (e) is present in an amount of about 4 percent, based on the dry weight of calcium carbonate.

3. A method of claim 1 wherein the weak acid of step (e) is phosphoric acid.

4. A method of claim 1 wherein the initial low solids slurry of step (a) is about 18 wt. % solids, the intermediate slurry of step (c) is about 44 wt. % solids, and the final product slurry of step (d) is about 35 wt. % solids.

5. A method of claim 1 wherein the initial low weight solids of the slurry of step (a) has a Brookfield viscosity of about 30 centipoise at 100 rpm, and wherein the final product slurry of step (e) has a Brookfield viscosity ranging from 200 to about 500 centipoise at 100 rpm.

6. A method for producing a stable, high solids aqueous slurry having a solids in a range from about 20% to about 40% of an acid-resistant calcium carbonate composition, the steps comprising:

(a) forming an initial low solids slurry having a solids content in a range from about 10% to about 20% by weight of calcium carbonate particles;

(b) adding at least about 0.1 percent, based on the dry weight of calcium carbonate, of a chemical additive imparting acid resistance to said calcium carbonate, to the low solids slurry of step (a) to produce a slurry with an alkaline pH;

(c) dewatering a resultant slurry of step (b) to produce an intermediate slurry with a wt. % solids in a range from about 40% to about 50% by weight calcium carbonate;

(d) forming a final product slurry having a wt. % solids in said range from about 20% to about 40% by adding a liquid to a resultant slurry of step (c); and (e) adding at least about 0.1 percent, based on the dry weight of calcium carbonate, of at least one weak acid to a resultant slurry of step (d) in order to reduce the pH of the slurry into a neutrally buffered range of about 6.0 to about 7.5.

7. A method of claim 6 wherein the chemical of step (b) is present in an amount of about 1.0 percent, based on the dry weight of calcium carbonate and wherein the weak acid of step (e) is present in an amount of about 4 percent, based on the dry weight of calcium carbonate.

8. A method of claim 6 wherein the initial low solids slurry of step (a) is about 18 wt. % solids, the intermediate slurry of step (c) is about 44 wt. % solids, and the final product slurry of step (d) is about 35 wt. % solids.

9. A method of claim 6 wherein the liquid of step (d) is an overflow of the low solids slurry of step (b) which has been treated with said chemical.

10. A method for producing a stable, high solids aqueous slurry having a solids in a range of about 20% to about 40% by weight of an acid-resistant calcium carbonate, the steps comprising:

(a) forming an initial low solids slurry having a solids content in a range of from about 10% to about 20% by weight of calcium carbonate particles;

(b) adding at least about 0.1 percent, based on the dry weight of calcium carbonate, of a chemical additive imparting acid resistance to said calcium carbonate, to the low solids slurry of step (a) to produce a slurry with an alkaline pH;

(c) dewatering a resultant slurry of step (b) to form a final product slurry having said 20% to 40% by weight calcium carbonate; and (d) adding at least about 0.1 percent based on the dry weight of calcium carbonate, of at least one weak acid to the slurry of step (c) in order to reduce the pH of the slurry into a neutrally buffered range of about 6.0 to about 7.5.

* * * * *